Sept. 9, 1930.  G. W. BLAIR  1,775,419
FASTENER
Filed June 24, 1926
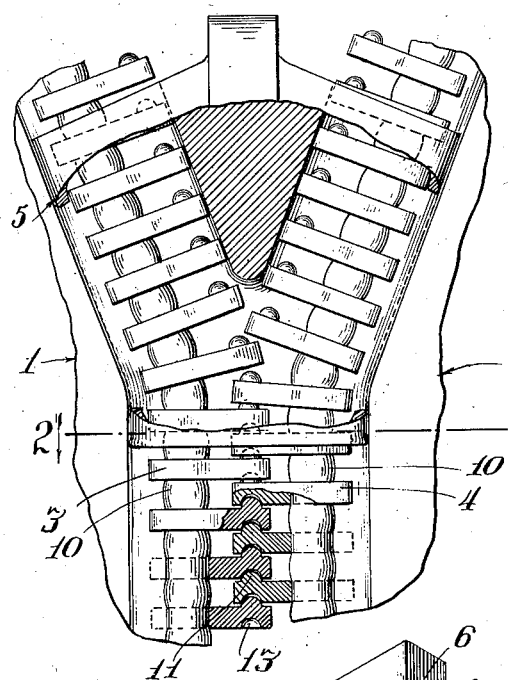
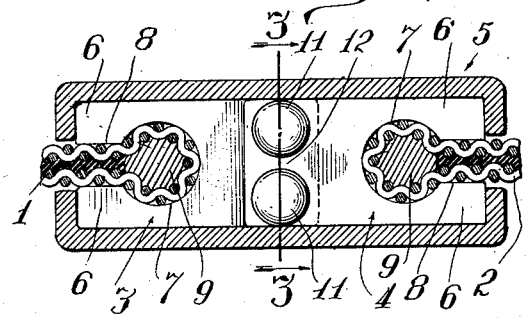
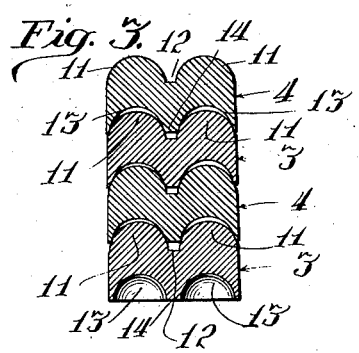
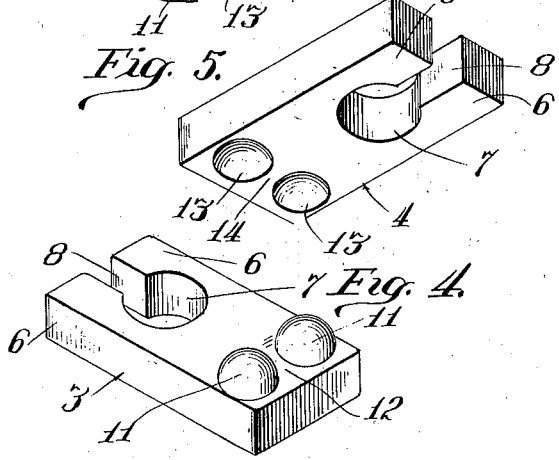
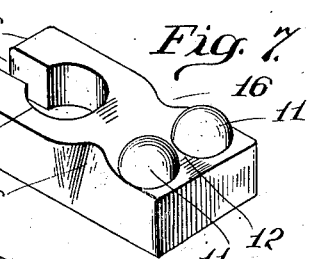
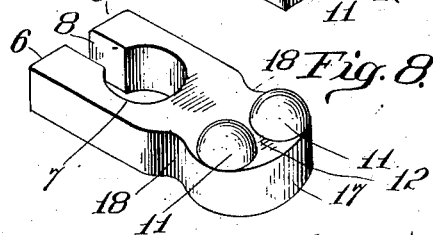
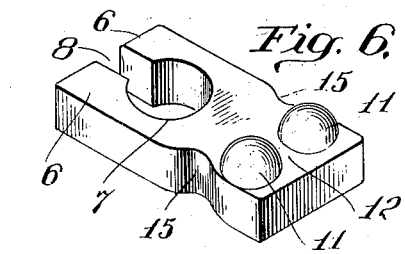
Inventor
George W. Blair
By Eugene M. Giles
Attorney Patented Sept. 9, 1930

1,775,419

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

FASTENER

Application filed June 24, 1926. Serial No. 118,185.

My invention has reference more particularly to fastening devices of the type wherein each of the parts to be connected has a series of fastener elements on the edge thereof which interlock and release progressively by means of a cam member or slider which operates along the two series of fastener elements.

A convenient form of fastener of this type comprises flat elements which are secured in spaced relation on the edges of the parts to be connected, so that the projecting portions of the elements on one side enter between the projecting portions of the elements on the other side, such projecting portions being suitably formed to interlock when they are closed together. This type of fastener element may be advantageously employed where a high degree of flexibility is desired, as the flat plate-like formation of the elements affords a comparatively large number of joints per linear inch and if the elements are properly constructed and arranged to permit lateral angular adjustment of the adjoining interlocked elements, the interlocked fastener may be bent or doubled over very sharply. It is important however, that the interlocking means be arranged to facilitate or permit angular adjustment of the adjoining interlocked elements without possibility of the elements pulling apart or slipping sidewise out of engagement when the fastener is bent or doubled over.

The principal objects of my invention are to provide fastener elements with interlocking means affording a high degree of lateral angular adjustment of the interlocked elements and a corresponding high degree of flexibility of the interlocked fastener; to insure the maintaining of a positive and dependable interlocking of the fastener elements when the fastener is bent or doubled over; to maintain the interlocked elements in proper alignment against twisting or turning about the longitudinal axis of the interlocked fastener; to afford the same security against disengagement when the fastener is bent or doubled over toward either side; to provide clearance for the extremities of the interlocked portions whereby clamping or prying action between the elements is avoided in the bending or flexing of the fastener; and in general, to provide a simple substantial and dependable form of fastener element which may be readily and conveniently manufactured.

On the drawings:

Fig. 1 is a fragmentary front view of a fastening device embodying my improvements, parts being broken away and shown in section, to disclose details of the construction and operation;

Fig. 2 is a sectional view, taken on the line 2—2 of Fig. 1;

Fig. 3 is a sectional view, taken on the line 3—3 of Fig. 2;

Figs. 4 and 5 are top and bottom perspective views respectively of one of the fastener elements; and Figs. 6, 7 and 8 are top perspective views of modified forms of fastener elements.

Referring to the drawings, the reference numerals 1 and 2 indicate fragmentary portions of the parts which are to be connected and 3 and 4 the fastener elements which are secured respectively to the edges of the parts 1 and 2 and adapted to be interlocked and released by movement of the cam member or slider 5 along the opposed series of elements 3 and 4. The elements 3 and 4 are alike and each consists of an elongated flat member, as shown in Figs. 4 and 5, with means at one end for securing same to the part 1 or 2 and with means at the other end for interlocking engagement with elements of the opposed series.

The elements may be mounted on the parts 1 and 2 in any desired manner, a convenient form being shown wherein jaws 6 are formed at the mounting end of the element by providing the latter with an aperture 7 and a slot 8 leading outwardly therefrom and said jaws are clamped upon the enlarged or corded edge 9 of the part 1 or 2 so as to hold the elements securely thereon in the proper spaced relation. With this construction the enlarged or corded edge 9 is embraced in the aperture 7 of the fastener element and the part 1 or 2, which is usually of fabric, projects outwardly through the slot 8 as shown in Fig. 2, and in practice the corded edge 9 is of suitable construction so that the clamping of the elements thereon and the resulting compression of the enlarged or corded edge causes a puffing of the intermediate portion of the corded edge as indicated at 10, to cushion the elements against undue flexing and to insure a uniform degree of separation or fanning out of the interlocking ends of the element in the interlocking and releasing operations.

In the interlocking of the elements 3 and 4, the portions of the elements on one side beyond the corded edge 10 are inserted between the corresponding portions of the elements on the other side as indicated in Figs. 1 and 2, and to effect the interlocking engagement of these overlapped ends, each element 3 and 4 is formed, adjacent its outer end, with a plurality of projections on one side and a plurality of correspondingly arranged recesses on the other side, so that the projections on each element engage in the recesses of an adjoining element of the opposite series. The projections and recesses may be of any desired form, the former being preferably in the form of rounded bosses 11 and arranged flush with the lateral edges of the elements as shown particularly in Fig. 3 and spaced apart so as to provide a recess 12 between the projections. The bosses may however, if desired, be set back from the lateral edges of the element. These projections are preferably formed by a stamping operation which provides corresponding recesses 13 in the opposite side of the element with an intermediate web portion 14 which, in the interlocked position, is interposed between the projections 11 of the opposed fastener element. The projections 11 and recesses 13 are preferably located slightly back from the end face of the element so as to leave ample stock beyond the recesses 13 for strength and durability.

With a fastener of this construction the spaced rounded projections provide ample interlocking engagement so as to effectively prevent direct separation of the interlocked elements and by reason of the location of the two projections at the respective lateral edges of the element, extreme flexibility is afforded as the projections along one side of the fastener form bearings or fulcrum points for angular adjustment of the adjoining elements when the fastener is bent or doubled over in one direction, while the projections at the opposite side serve in like manner when the fastener is bent or doubled over in the other direction, and the bending in either direction increases the security of interlocking of the projections and recesses at the inner side of the bend. Furthermore, in view of the intermediate rib 14 and recess 12, it will be observed that an extreme extent of angular adjustment is necessary before the rib 14 is lifted sufficiently to permit the projection 11 at the inner side to slide laterally thereunder, and the assembled fastener cannot bend or double over sufficiently to disengage the elements in this manner.

It will be observed that when the fastener is interlocked, the extreme end of each element is interposed between adjoining elements of the opposed series immediately behind the projections and recesses thereof. In order to afford clearance for said end at each side of the fastener and thereby permit greater freedom in flexing or bending, the lateral edges of the fastener elements may be notched behind the projections 11. These notches may extend through the entire edge of the element or from top to bottom as indicated at 15 in Fig. 6 or they may be confined to the projection side of the element as indicated at 16 in Fig. 7. Moreover, the end of the element may be cut off square as shown in Figs. 1 to 7 inclusive, or the end may be rounded as indicated at 17 in Fig. 8, and the element of Fig. 8 may be formed with or without notches 18, and such notches may be of the form indicated at 16 in Fig. 7 if desired.

From the foregoing it will be observed that I have provided a fastener of simple form which is convenient to manufacture and affords a secure and dependable interlocking engagement which is unaffected by bending or doubling over the fastener. Moreover, the arrangement of the elements with a pair of laterally spaced projections insures the maintaining of the interlocked elements against relative swinging movement around the longitudinal axis of the fastener.

While I have shown and described my invention in a preferred form, I am aware that various changes and modifications may be made without departing from the principles of my invention, the scope of which is to be determined by the appended claim.

I claim as my invention:

In a fastener element for a fastening device of the class described, the combination of an elongated flat member having means at one end for mounting the member on a tape or stringer and having a plurality of closely adjoining separate and independent recesses and corresponding projections of substantially hemispherical form adjacent the other end and at opposite sides respectively thereof and occupying nearly the entire width of the member.

GEORGE W. BLAIR.